United States Patent
Yamagami et al.

(10) Patent No.: US 8,865,801 B2
(45) Date of Patent: Oct. 21, 2014

(54) EPOXY RESIN-BASED COATING COMPOSITION

(75) Inventors: Isao Yamagami, Tokyo (JP); Hiroki Takenaka, Tokyo (JP); Katsumi Murofushi, Tokyo (JP)

(73) Assignee: Showa Denko K.K., Tokyo (JP)

( * ) Notice: Subject to any disclaimer, the term of this patent is extended or adjusted under 35 U.S.C. 154(b) by 134 days.

(21) Appl. No.: 13/322,899

(22) PCT Filed: May 27, 2010

(86) PCT No.: PCT/JP2010/058956
§ 371 (c)(1),
(2), (4) Date: Nov. 28, 2011

(87) PCT Pub. No.: WO2010/137636
PCT Pub. Date: Dec. 2, 2010

(65) Prior Publication Data
US 2012/0077903 A1  Mar. 29, 2012

(30) Foreign Application Priority Data
May 28, 2009  (JP) ................................. 2009-128854

(51) Int. Cl.
 C08G 59/66 (2006.01)
 C08G 59/50 (2006.01)
 C09D 163/00 (2006.01)
 C09D 7/00 (2006.01)

(52) U.S. Cl.
 CPC ............... *C08G 59/66* (2013.01); *C09D 7/001* (2013.01); *C09D 163/00* (2013.01); *C08G 59/50* (2013.01)
 USPC ............................ 523/400; 528/109; 528/121

(58) Field of Classification Search
 CPC ....... C08G 59/66; C08G 59/50; C09D 163/00
 USPC .................... 523/400; 528/109, 121
 See application file for complete search history.

(56) References Cited

U.S. PATENT DOCUMENTS

| 4,220,513 | A | 9/1980 | Green et al. |
| 5,424,365 | A | 6/1995 | Elmore et al. |
| 5,430,112 | A | 7/1995 | Sakata et al. |
| 8,242,217 | B2 * | 8/2012 | Urakawa et al. ............... 525/533 |

FOREIGN PATENT DOCUMENTS

| GB | 1044715 | | 10/1966 |
| GB | 1312821 | | 4/1973 |
| JP | 42-026535 | B1 | 12/1967 |
| JP | 42-026535 | B1 | 12/1967 |
| JP | 46-000732 | A | 9/1971 |
| JP | 46-000732 | A | 9/1971 |
| JP | 54-116096 | A | 9/1979 |
| JP | 63-186726 | A | 8/1988 |
| JP | 63-186727 | A | 8/1988 |
| JP | 5-112632 | A | 5/1993 |
| JP | 6-088053 | A | 3/1994 |
| JP | 6-116515 | A | 4/1994 |
| JP | 6-211969 | A | 8/1994 |
| JP | 08-176500 | A | 7/1996 |
| JP | 2001-207058 | A | 7/2001 |
| JP | 2002-012818 | A | 1/2002 |
| JP | 2002-527552 | A | 8/2002 |
| JP | 2008-299294 | A * | 12/2008 |
| JP | 2009-091438 | A | 4/2009 |

* cited by examiner

*Primary Examiner* — Randy Gulakowski
*Assistant Examiner* — Ha Nguyen
(74) *Attorney, Agent, or Firm* — Sughrue Mion, PLLC

(57) ABSTRACT

The present invention relates to epoxy resin coating composition which comprises, at least, epoxy resin, a thiol-type curing agent and a curing assistant, being composed of two liquids of liquid (A) containing epoxy resin and a thiol-type curing agent and liquid (B) containing a curing assistant, which liquids are mixed just before using, wherein the thiol-type curing agent contains a branched compound containing a thiol group (P), which compound is an ester of polyhydric alcohol with thiol group-containing carboxylic acid represented by formula (1)

$$HOCO(CH_2)_n CR^1 R^2 SH \quad (1)$$

(in the formula, $R^1$ represents a hydrogen atom or a linear or branched alkyl group having 1 to 10 carbon atoms, $R^2$ represents a linear or branched alkyl group having 1 to 10 carbon atoms, and n represents an integer of 1 to 4), which exhibits a suitable pot life, excellent curability particularly at low and ordinary temperature and low toxicity.

10 Claims, No Drawings

EPOXY RESIN-BASED COATING COMPOSITION

CROSS REFERENCE TO RELATED APPLICATION

This application is a National Stage of International Application No. PCT/JP2010/058956, filed on May 27, 2010, claiming priority based on Japanese Patent Application No. 2009-128854, filed on May 28, 2009, the contents of which are incorporated herein by reference in their entirety.

TECHNICAL FIELD

The present invention relates to a two-component curable epoxy resin coating composition prepared by mixing two liquids having good storage stability just before using, which exhibits a suitable pot life, excellent curability particularly at low and ordinary temperature. Specifically, the present invention relates to an epoxy resin coating composition prepared by mixing liquid (A) containing epoxy resin and a specific thiol-type curing agent and liquid (B) containing a curing assistant.

BACKGROUND ART

Conventionally, an epoxy resin coating exhibiting excellent curability at ordinary temperature has been used for coating large-scale architectures such as vessels, bridges, manufacturing plants, roads and floors, wherein curing by heating is not available.

Also, as a coating composition which is curable during the winter season or in cold regions, a coating composition containing polyisocyanate has been developed and used in the cases where curing at a temperature of 5° C. or lower is required. A tin composition is used as a curing catalyst in polyisocyanate-based coating compositions, and the use of the tin compound is seen as a problem because even a small amount of a tin compound is highly toxic. Therefore, a coating composition which has low toxicity and is curable at low temperatures has been demanded.

A compound containing two or more thiol groups in one molecule reacts more readily to form a cured product by being mixed with epoxy resin, urethane resin and the like, such a compound has been widely used for sealing materials, coatings, adhesives and the like. For example, "Epoxy Resin Review" (Vol. 1, Basic Edition I, published on Nov. 19, 2003) describes at page 204 various polythiol-based curing agents as a curing agent at low temperature.

Meanwhile, as an epoxy resin coating composition, it is desired to employ the formulation of mixing two liquids comprising liquid (A) and liquid (B) just before coating due to ease in handling.

However, in the case where a conventional polythiol-based epoxy curing agent is used as a curing agent for an epoxy resin coating composition, when polythiol is added to liquid (A) containing epoxy resin, it decreases storage stability due to high reactivity between epoxy resin and polythiol. When conventional polythiol is added to liquid (B) containing a curing assistant, thiol is activated by the tertiary amine used as a curing assistant and generates a disulfide bond by reacting with oxygen in air, which often results in forming a skim during the storage of liquid (B).

JP-A-H06-116515 (Patent Document 1) discloses an antifouling coating composition containing epoxy resin and a mercapto carboxylic acid ester curing agent for the use as an antifouling paint in sea water used for vessels and the like. Patent Document 1 describes formulation of obtaining a coating by mixing liquid (A) containing epoxy resin, a pigment and the like and liquid (B) containing a mercapto carboxylic acid ester curing agent and an amine curing agent. However, the mercapto carboxylic acid ester disclosed therein is a compound in which a thiol group is bonded to primary carbon, unlike the branched compound containing a thiol group (P) used in the present invention, and therefore has a problem in storage stability of the solution containing a mercapto carboxylic acid ester curing agent.

JP-A-2002-527552 (WO 00/22025) (Patent Document 2) discloses a coating composition containing epoxy resin, a curing agent containing a thiol group and a catalyst for curing, which has attained a suitable pot life and a suitable curing time by using a specific solvent for the mixture of epoxy resin, a thiol compound and a curing assistant. However, Patent Document 2 does not describe a branched compound containing a thiol group (P) used in the present invention, and the storage stability of the curing agent containing a thiol group either. Furthermore, though Patent Document 2 teaches storing a catalyst separately from resin, it does not teach storing a catalyst being mixed with a curing agent. Therefore, it is not clear how the curing agent containing epoxy resin, a catalyst and a thiol group described in Patent Document 2 can be stored as being two liquids.

JP-A-08-176500 (Patent Document 3) discloses a method for applying a rapidly curable coating composition, which comprises applying a composition containing an epoxy compound and a polymercapto compound in a specific ratio on a substrate to be cured, but Patent Document 3 does not describe a branched compound containing a thiol group (P) used in the present invention. In the coating method described in Patent Document 3, it is necessary to apply a curing catalyst such as secondary amine and tertiary amine in the form of mist or steam, which makes the operation complicated and raises a problem in terms of the work environment such as an irritating odor of the curing assistant.

PRIOR ART

Patent Documents

Patent Document 1: JP-A-H06-116515
Patent Document 2: JP-A-2002-527552
Patent Document 3: JP-A-H08-176500

DISCLOSURE OF THE INVENTION

Problems to be Solved by the Invention

An object of the present invention is to provide a two-component curable epoxy resin coating composition prepared by mixing two liquids having good storage stability just before using, which exhibits a suitable pot life, excellent curability particularly at low and ordinary temperature and low toxicity.

Means to Solve the Problem

As a result of intensive studies to achieve the above object, the present inventors have found that an epoxy resin coating composition prepared by mixing liquid (A) containing epoxy resin and a specific branched compound containing a thiol group (P) and liquid (B) containing a curing assistant just before using has a suitable pot life, excellent curability particularly at low and ordinary temperature, and low toxicity; and that the two liquids are easy to store because liquid (A)

containing a branched compound containing a thiol group (P) has good storage stability, which is advantageous in workability; and have accomplished the present invention.

That is, the present invention relates to the epoxy resin coating composition as follows.

[1] An epoxy resin coating composition which comprises, at least, epoxy resin, a thiol-type curing agent and a curing assistant, being composed of two liquids of liquid (A) containing epoxy resin and a thiol-type curing agent and liquid (B) containing a curing assistant, which liquids are mixed just before using, wherein the thiol-type curing agent contains a branched compound containing a thiol group (P), which compound is an ester of polyhydric alcohol with thiol group-containing carboxylic acid represented by formula (1)

$$HOCO(CH_2)_nCR^1R^2SH \qquad (1)$$

(in the formula, $R^1$ represents a hydrogen atom or a linear or branched alkyl group having 1 to 10 carbon atoms, $R^2$ represents a linear or branched alkyl group having 1 to 10 carbon atoms, and n represents an integer of 1 to 4).

[2] The epoxy resin coating composition according to [1] above, wherein the branched compound containing a thiol group (P) is an ester of polyhydric alcohol with thiol group-containing carboxylic acid represented by formula (2)

$$HOCOCH_2CR^1R^2SH \qquad (2)$$

(in the formula, $R^1$ and $R^2$ have the same meanings as in [1] above).

[3] The epoxy resin coating composition according to [1] or [2] above, wherein the branched compound containing a thiol group (P) is an ester of polyhydric alcohol with thiol group-containing carboxylic acid represented by formula (3).

$$HOCOCH_2CH(CH_3)SH \qquad (3)$$

[4] The epoxy resin coating composition according to any one of [1] to [3] above, wherein the polyhydric alcohol is a polyhydric alcohol having 2 to 30 carbon atoms and having a valence of 2 to 6.

[5] The epoxy resin coating composition according to any one of [1] to [4] above, wherein the polyhydric alcohol is at least one member selected from a group consisting of ethylene glycol, 1,2-propylenediol, 1,3-propanediol, 1,4-butanediol, trimethylolpropane, pentaerythritol, 2,2-bis(2,3-dihydroxypropyloxyphenyl)propane, glycerin, trimethylolethane, tris(2-hydroxyethyl)isocyanurate and dipenthaerythritol.

[6] The epoxy resin coating composition according to any one of [1] to [5] above, wherein the branched compound containing a thiol group (P) is at least one compound selected from a group consisting of ethylene glycol bis(3-mercaptobutyrate), 1,2-propylene glycol bis(3-mercaptobutylate), 1,3-propylene glycol bis(3-mercaptobutylate), 1,4-butanediol bis(3-mercaptobutylate), 2,2-bis(3-(3-mercaptobutyryloxy)-2-hydroxypropyloxyphenyl)propane, glycerin tris(3-mercaptobutyrate), trimethylolpropane tris(3-mercaptobutyrate), trimethylolpropane bis(3-mercaptobutyrate), trimethylolethane bis(3-mercaptobutyrate), pentaerythritol bis(3-mercaptobutyrate), trimethylolethane tris(3-mercaptobutyrate), pentaerythritol tris(3-mercaptobutyrate), tris(3-mercaptobutyryloxyethyl)isocyanurate, a compound wherein two 3-mercaptobutanoic acid have undergone addition to tris(2-hydroxyethyl)isocyanurate, pentaerythritol tetrakis(3-mercaptobutyrate), dipentaerythritol pentakis(3-mercaptobutyrate), dipentaerythritol hexakis(3-mercaptobutyrate), bisphenol A ethoxylate bis(3-mercaptobutyrate), 4,4'-(9-fluorenylidene)bis(2-phenoxyethanol)bis(3-mercaptobutyrate), pentaerythritol tris(3-mercaptovalerate), ethyleneglycol bis(3-mercaptovalerate), trimethylolpropane tris(3-mercaptovalerate), trimethylolpropane bis(3-mercaptovalerate), pentaerythritol bis(3-mercaptovalerate), pentaerythritol tris(3-mercaptovalerate), pentaerythritol tetrakis(3-mercaptovalerate), ethyleneglycol bis(3-mercaptoisovalerate), pentaerythritol bis(3-mercaptoisovalerate), trimethylpropane tris(3-mercaptoisovalerate), trimethylpropane bis(3-mercaptoisovalerate), pentaerythritol tris(3-mercaptoisovalerate) and pentaerythritol tetrakis(3-mercaptoisovalerate).

[7] The epoxy resin coating composition according to any one of [1] to [6] above, wherein an aprotic volatile solvent is used in the liquid (A).

[8] The epoxy resin coating composition according to [7] above, wherein the solvent of the liquid (A) comprises one or more solvents selected from the group consisting of aliphatic hydrocarbon, aromatic hydrocarbon, ethers, esters other than the said thiol-type curing agent or curing assistant, ketones and N,N-dialkylamides; and the solvent does not contain any functional group of an alcoholic hydroxyl group, a phenolic hydroxyl group, a carboxyl group or an amino group.

[9] The epoxy resin coating composition according to any one of [1] to [8] above, wherein the liquid (B) contains at least one amine-type curing agent selected from a group consisting of polyamine, modified polyamine and polyamide amine.

[10] The epoxy resin coating composition according to any one of [1] to [9] above, wherein the epoxy resin is a glycidyl ether compound of polyol.

[11] The epoxy resin coating composition according to any one of [1] to [10] above, wherein the curing assistant is tertiary amine.

Effects of the Invention

The present invention is to provide an epoxy resin coating composition prepared by mixing liquid (A) containing epoxy resin and a specific branched compound containing a thiol group (P) and liquid (B) containing a curing assistant just before using.

In the epoxy resin coating composition of the present invention, the liquid (A) containing a branched compound containing a thiol group (P) has good storage stability, and therefore the two liquids are easy to store, which is advantageous in workability. Furthermore, the composition of the present invention has a more suitable pot life compared to the composition using a conventional amine-type curing agent, and very excellent curability particularly at low and ordinary temperature, as well as low toxicity.

MODE FOR CARRYING OUT THE INVENTION

The embodiments for carrying out the present invention are described in details hereinafter.

[1] Curing Agent

[I-1] Thiol-Type Curing Agent

The epoxy resin coating composition of the present invention contains a thiol-type curing agent.

The thiol-type curing agent used in the present invention contains a specific branched compound containing a thiol group (P) which is an ester of polyhydric alcohol with thiol group-containing carboxylic acid represented by formula (1).

$$HOCO(CH_1)_nCR^1R^2SH \qquad (1)$$

In formula (1), $R^1$ represents a hydrogen atom or a linear or branched alkyl group having 1 to 10 carbon atoms, $R^2$ represents a linear or branched alkyl group having 1 to 10 carbon atoms, and n represents an integer of 1 to 4. That is, the branched compound containing a thiol group (P) is secondary thiol or tertiary thiol.

Compared to a conventional thiol-type curing agent using primary thiol, the secondary or tertiary thiol used in the present invention has low reactivity with epoxy resin, and therefore when it is employed in the two-component epoxy resin coating composition, it improves the storage stability of liquid (A) containing epoxy resin and a branched compound containing a thiol group (P). As a result, two liquids are easy to store, which is advantageous in workability.

With respect to $R^1$ and $R^2$ in formula (1), it is preferable from the viewpoint of the pot life and storage stability that $R^1$ represents a hydrogen atom or a linear or branched alkyl group having 1 to 6 carbon atoms and $R^2$ represents a linear or branched alkyl group having 1 to 6 carbon atoms. More preferably, $R^1$ represents a hydrogen atom or a linear or branched alkyl group having 1 to 4 carbon atoms and $R^2$ represents a linear or branched alkyl group having 1 to 4 carbon atoms; and still more preferably, $R^1$ represents a hydrogen atom or an alkyl group having 1 to 2 carbon atoms and $R^2$ represents an alkyl group having 1 to 2 carbon atoms.

Examples of the linear or branched alkyl group having 1 to 10 carbon atoms include methyl group, ethyl group, propyl group, isopropyl group, n-butyl group, isobutyl group, sec-butyl group, tert-butyl group, n-pentyl group, isopentyl group, tert-pentyl group, neopentyl group, hexyl group, isohexyl group, heptyl group, octyl group, nonyl group and decyl group.

Examples of carboxylic acid containing such a thiol group include 3-mercaptobutylic acid, 3-mercaptovaleric acid, 3-mercaptoisovaleric acid, 4-mercaptovaleric acid, 3-mercaptocaproic acid, 4-mercaptocaproic acid, 5-mercaptocaproic acid and 3-mercaptoisocaproic acid.

For reasons of a production method capable of being formed by addition reaction of α,β-unsaturated ketone to an SH group, n in formula (1) is preferably 1. That is, the branched compound containing a thiol group (P) used in the present invention is preferably an ester of polyhydric alcohol with the thiol group-containing carboxylic acid represented by formula (2).

HOCOCH$_2$CR$^1$R$^2$SH  (2)

For example, a compound in which $R^1$ and $R^2$ represent a hydrogen atom and a methyl group, respectively, represented by formula (3)

HOCOCH$_2$CH(CH$_3$)SH  (3)

is more preferred because the compound can be easily produced by inserting a thiol group using easily-available crotonic acid.

The thiol group equivalent to be defined as the molecular weight per thiol group of the branched compound containing a thiol group (P) used in the present invention is 100 to 500, preferably 100 to 300, and more preferably 100 to 200. If the thiol group equivalent falls within the above ranges, the amount of reactive points in the epoxy resin coating composition is appropriate, and the composition can form a coating film which has both curability and toughness. When the thiol group equivalent is less than 100, the coating film becomes fragile, while the coating film softens when the thiol group equivalent exceeds 500. The thiol group equivalent can be measured by a known method, for example, the iodometric titration using starch as the indicator.

There are no particular limitations on polyhydric alcohol used in the present invention, and aliphatic and aromatic polyhydric alcohol can be used. The polyhydric alcohol preferably has 2 to 30 carbon atoms and a valence of 2 to 6, and more preferably, 5 to 20 carbon atoms and a valence of 3 to 4. When the number of carbon atoms is less than 2, the steam pressure of the ester of polyhydric alcohol with the above-mentioned thiol group-containing carboxylic acid increases, thereby making the odor of the coating composition strong. When the number of carbon atoms exceeds 30, it results in disadvantages such that the coating film is softened. When the valence is less than 2, cross-linking reaction is not caused in the polythiol region, which leads to the drawback that the coating film is softened. When the valence exceeds 6, it results in the drawback that the coating film is fragile due to the decrease in the reactivity of thiol.

Examples of the polyhydric alcohol used in the present invention include dihydric alcohol such as ethylene glycol, diethylene glycol, triethylene glycol, tetraethylene glycol, polyethylene glycol, propylene glycol, dipropylene glycol, tripropylene glycol, polypropylene glycol, neopentyl glycol, 1,2-propanediol, 1,3-propanediol, 1,3-butanediol, 1,4-butanediol, 1,2-pentanediol, 1,3-pentanediol, 2,3-pentanediol, 1,4-pentanediol, 1,5-pentanediol, 1,6-hexanediol, 1,9-nonanediol, tricyclodecane dimethanol, (2,2-bis(2-hydroxyethoxyphenyl)propane), bisphenol A alkylene oxide adduct, bisphenol F alkylene oxide adduct, bisphenol S alkylene oxide adduct, 1,4-cyclohexanediol, 1,4-cyclohexanedimethanol, 1,2-hexanediol, 1,3-hexanediol, 2,3-hexanediol, 1,4-hexanediol, 2,4-hexanediol, 3,4-hexanediol, 1,5-hexanediol, 2,5-hexanediol, 1,6-hexanediol, 9,9-bis[4-(2-hydroxyethyl)phenyl]fluorene; and tri- or higher hydric alcohol such as glycerin, diglycerin, trimethylolethane, trimethylolpropane, ditrimethylolpropane, tris(2-hydroxyethyl)isocyanurate, hexanetriol, sorbitol, pentaerythritol, dipentaerythritol, sucrose and 2,2-bis(2,3-dihydroxypropyloxyphenyl)propane, but the alcohol is not limited thereto. Among these, ethylene glycol, 1,2-propylenediol, 1,3-propanediol, 1,4-butanediol, trimethylolpropane, pentaerythritol, 2,2-bis(2,3-dihydroxypropyloxyphenyl)propane, glycerin, trimethylolethane, tris(2-hydroxyethyl)isocyanurate and dipentaerythritol are preferable from the viewpoint of availability of raw materials; and trimethylolpropane, pentaerythritol and tris(2-hydroxyethyl)isocyanurate are more preferable from the viewpoint of the number of functional groups and the steam pressure. These may be used singly or in combination of two or more at any ratio.

Examples of the branched compound containing a thiol group (P) used in the present invention includes ethyleneglycol bis(3-mercaptobutyrate), 1,2-propyleneglycol bis(3-mercaptobutyrate), 1,3-propyleneglycol bis(3-mercaptobutyrate), 1,4-butanediol bis(3-mercaptobutyrate), 2,2-bis(3-(3-mercaptobutyryloxy)-2-hydroxypropyloxyphenyl) propane, glycerin tris(3-mercaptobutyrate), trimethylolpropane tris(3-mercaptobutyrate), trimethylolpropane bis(3-mercaptobutyrate), trimethylolethane bis(3-mercaptobutyrate), pentaerythritol bis(3-mercaptobutyrate), trimethylolethane tris(3-mercaptobutyrate), pentaerythritol tris(3-mercaptobutyrate), tris(3-mercaptobutyryloxyethyl) isocyanurate, a compound wherein two 3-mercaptobutanoic acid have undergone addition to tris(2-hydroxyethyl)isocyanurate, pentaerythritol tetrakis(3-mercaptobutyrate), dipentaerythritol pentakis(3-mercaptobutyrate), dipentaerythritol hexakis(3-mercaptobutyrate), bisphenol A ethoxylate bis(3-mercaptobutyrate), 4,4'-(9-fluorenylidene)bis(2-phenoxyethanol)bis(3-mercaptobutyrate), ethyleneglycol bis(3-mercaptovalerate), trimethylolpropane tris(3-mercaptovalerate), trimethylolpropane bis(3-mercaptovalerate), pentaerythritol bis(3-mercaptovalerate), pentaerythritol tris(3-mercaptovalerate), pentaerythritol tetrakis(3-mercaptovalerate), ethyleneglycol bis(3-mercaptoisovalerate), trimethylolpropane bis(3-mercaptoisovalerate), pentaerythritol bis(3-mercaptoisovalerate), trimethylolpropane tris(3-mercaptoisovalerate), pentaerythritol tris(3-mercaptoisovalerate) and pentaerythritol tetrakis(3-mercaptoisovalerate), but compound (P) is not limited thereto. Among these, 1,4-butanediol bis(3-mercaptobutyrate), trimethylolpropane tris(3-mercaptobutyrate), pentaerythritol tetrakis(3-mercaptobutyrate) and tris (3-mercaptobutyryloxyethyl)isocyanurate are preferable in terms of the availability of the raw materials, the number of functional groups and the steam pressure. These may be used singly or in combination of two or more at any ratio.

[1-2] Other Curing Agents

Conventionally known curing agents may be added to the epoxy resin coating composition of the present invention within a scope which does not affect the objects of the invention.

As such a curing agent, for example, an amine-type curing agent such as polyamideamine, polyamine, epoxy modified polyamine and isocyanate modified polyamine. Specifically, examples include amine-type curing agents such as ADEKA hardener EH-471, EH-3385 and GM-645 manufactured by ADEKA Corporation; VERSAMID (registered trademark) 115, VERSAMIN (registered trademark) K11 and VERSAMIN 3202N manufactured by Cognis Japan Ltd.; SL11 and SL13 manufactured by Japan Epoxy Resins Co., Ltd.; and LUCKAMIDE (registered trademark) WN-125 manufactured by DIC Corporation.

Also, as such a curing agent, a commercial thiol-type curing agent may be used. Specifically, examples include thiol-type curing agents other than the branched compound containing a thiol group (P) used in the present invention such as trimethylolpropane tris(3-mercaptopropionate), pentaerythritol tetrakis(3-mercaptopropionate), THIOKOL (registered trademark) LP and QE-340M manufactured by Toray Fine Chemicals Co., Ltd.; EH-317 and EH-310 manufactured by ADEKA Corporation; CAPCURE (registered trademark) 3-800 manufactured by Cognis Japan Ltd., QX11 manufactured by Japan Epoxy Resins Co., Ltd.

[II] Epoxy Resin

There no particular limitations on the epoxy resin used in the present invention, and commercial curable epoxy resin can be used.

Examples of such epoxy resin include bisphenols such as bisphenol A, halogenated bisphenol A, bisphenol F, halogenated bisphenol F; polyhydric phenols such as resorcinol, hydroquinone, pyrocatechol, 4,4'-dihydroxybiphenyl and 1,5-didyhydroxynaphthalene; polyhydric alcohols such as ethylene glycol, propylene glycol and glycerin; and epoxy resins obtained by the addition of epichlorohydrin to aromatic carboxylic acids such as oxybenzoic acid or aromatic dicarboxylic acids such as phthalic acid.

Specifically, examples include bisphenol A-type epoxy resin, hydrogenated bisphenol A-type epoxy resin, brominated bisphenol A-type epoxy resin, bisphenol F-type epoxy resin, novolak-type epoxy resin, phenol novolak-type epoxy resin, cresol novolak-type epoxy resin, alicyclic epoxy resin, N-glycidyl-type epoxy resin, bisphenol A novolak-type epoxy resin, chelating epoxy resin, glyoxal-type epoxy resin, amino group-containing epoxy resin, rubber-modified epoxy resin, dicyclopentadiene phenolic-type epoxy resin, silicone-modified epoxy resin and ε-caprolactone modified epoxy resin, but the epoxy resin used in the present invention is not limited thereto.

As epoxy resin used in the present invention, a glycydil ether compound of polyol, such as bisphenol A diglycidyl ether, brominated bisphenol A diglycydil ether, bisphenol A ethoxylate diglycidyl ether, bisphenol A propoxylate diglycidyl ether, bisphenol F diglycidyl ether, cyclohexanedimethanol diglycidyl ether, 3,4-epoxycyclohexane carboxylate and 3,4-epoxycyclohexenylmethyl ester, is preferable in terms of the reactivity of the thiol compound and the availability.

Examples of the commercial epoxy resin include jER (registered trademark) 828, 1001, 801, 806, 807, 152, 604, 630, 871, YX8000, YX8034, YX4000 and Cardura E10P manufactured by Japan Epoxy Resins Co., Ltd.; Epichlon (registered trademark) 830, 835LV, HP4032D, 703, 720, 726 and HP820 manufactured by Dainippon Ink & Chemicals Co., Ltd.; EP4100, EP4000, EP4080, EP4085, EP4088, EPU6, EPR4023, EPR1309 and EP49-20 manufactured by ADEKA Corporation; Danachol EX411, EX314, EX201, EX212, EX252, EX111, EX146 and EX721 manufactured by Nagase ChemteX Corporation; and KBM403 and KBE402 manufactured by Shin-Etsu Chemical Co., Ltd., but the epoxy resin is not limited thereto.

These may be used singly or in combination of two or more at any ratio.

A monoepoxy compound can be added as a reactive diluent to the epoxy resin as needed. As a monoepoxy compound, a low molecular weight aliphatic glycidyl ether, aromatic monoglycidyl ether, glycidyl (meth)acrylate and the like may be used.

[III] Curing Assistant

There are no particular limitations on the curing assistant used in the present invention, but it is preferable to use a basic compound.

As a basic compound, tertiary amine can be used. As specific examples of tertiary amine, trimethylamine, triethylamine, tetramethylethylenediamine, tetraethylethylenediamine, tetramethylpropane-1,3-diamine, tetramethylhexane-1,6-diamine, pentamethyldiethylenetriamine, pentamethyldipropylenetriamine, bis(2-dimethylaminoethyl)ether, ethyleneglycol(3,3-dimethylaminopropyl)ether, dimethylaminoethanol, dimethylaminoethoxyethanol, N,N,N'-trimethylaminoethylethanolamine, dimethylcyclohexylamine, N,N-dimethylaminomethylphenol, N,N-dimethylpropylamine, N,N,N',N'-tetramethylhexamethylenediamine, N-methylpyperidine, N,N'-dimethylpiperazine, N,N-dimethylbenzylamine, 2,4,6-tris(dimethylaminomethyl)phenol, 1,8-diazabicyclo[5.4.0]undecene-7 (DBU), 1,5-diazabicyclo[4.3.0]-nonene, 5,6-dibutylamino-1,8-diazabicyclo[5.4.0]undecene-7,1,2-dimethylimidazol, N-methyl-N'-(2-dimethylamino)ethylpiperazine, N-methylmorpholine, N—(N', N'-dimethylamino)ethyl)morpholine, N-methyl-N'-(2-hydroxyethyl)morpholine and the like are preferable. Among these, N,N-dimethylbenzylamine and 2,4,6-tris(dimethylaminomethyl)phenol are particularly preferable. These may be used singly or in combination of two or more at any ratio.

In the present invention, a phosphorous atom-containing compound may be used as a curing assistant.

Specific examples of the phosphorous atom-containing compound include methylphosphine, ethylphosphine, phenylphosphine, dimethylphosphine, diethylphosphine, diphenylphosphine, trimethylphosphine, triethylphosphine, tributylphosphine, triphenylphosphine, tris(p-tolyl)phosphine, tris(alkylphenyl)phosphine, tris(alkoxyphenyl)phosphine, trimethyl phosphate, triethyl phosphate, triphenyl phosphate, trialkyl phosphate, tetraphenylphosphonium.tetraphenyl borate and 1,4-bis(diphenylphosphino)butane, but the compound is not limited thereto. These may be used singly or in combination of two or more at any ratio.

In the present invention, a commercial curing assistant may be used. Examples of the commercial curing assistant include Epicure (registered trademark) 3010 manufactured by Japan Epoxy Resins Co., Ltd.; an imidazole compound 2PZ, 2PHZ, 2P4 MHZ, C17Z, 2MZ-A, 2E4MZ-CNS, 2MA-OK manufactured by Shikoku Chemicals Corporation); Amicure (registered trademark) PN23, PN31, PN40J, PN-H, MY24 and MY-H manufactured by Ajinomoto Fine-Techno Co., Ltd.; EH-32935, EH-33665, EH-36155, EH-40705 EH-43425 and EH-37315 manufactured by ADEKA Corporation; Novacure (registered trademark) HX-3742 and HX-3721 manufactured by Asahi Kasei Chemicals Corporation; and FXE-1000, FXR-1030, FXR-1080 and FXR-1110 manufactured by Fuji Kasei Kogyo Co., Ltd., but the curing assistant is not limited thereto.

[IV] Epoxy Resin Coating Composition

The epoxy resin coating composition of the present invention contains, at least, epoxy resin, a thiol-type curing agent and a curing assistant. There are no particular limitations on the blending ratio of the epoxy resin, the thiol-type curing agent and the curing assistant, and the ratio may be determined appropriately depending on the intended use.

The epoxy resin coating composition of the present invention is prepared by mixing two liquids of liquid (A) containing the above-mentioned epoxy resin and the branched compound containing a thiol group (P) used in the present invention and liquid (B) containing a curing assistant just before using. Generally, a conventional epoxy resin coating composition comprises liquid (A) containing epoxy resin and liquid (B) containing an amine-type curing agent and a curing assistant. When the constitution is applied to a thiol-type curing agent and liquid (B) containing a thiol-type curing agent and a curing assistant is prepared, the mercapto group of the thiol-type curing agent is activated by the tertiary amine contained in the curing assistant and oxidized by oxygen in air, which raises a problem such as gelation or a skim in the composition. On the other hand, when a thiol-type curing agent is blended into liquid (A) containing epoxy resin, epoxy resin and a thiol-type curing agent react with each other in the case of using a conventional thiol-type curing agent, which causes gelation of the coating composition during storage. In the epoxy resin coating composition of the present invention, a specific branched compound containing a thiol group (P) is used and therefore epoxy resin without containing a curing assistant has low reactivity with the branched compound containing a thiol group (P). Consequently, the storage stability of liquid (A) containing epoxy resin and a branched compound containing a thiol group (P) is improved.

In the epoxy resin coating composition of the present invention, liquid (A) contains epoxy resin and a branched compound containing a thiol group (P) and liquid (B) at least contains a curing assistant. Besides these, in the coating composition of the present invention, a pigment, a dispersant, a defoamer, a solvent and the like can be blended into liquid (A) or liquid (B) as needed.

In the present invention, it is preferable that the coating composition is a two-component composition comprising liquid (A) containing epoxy resin and a branched compound containing a thiol group (P) and liquid (B) containing an amine-type curing agent and a curing assistant.

Although there are no particular limitations on the usage of the branched compound containing a thiol group (P), the mercapto group based on 1 mol of the epoxy group in the epoxy resin is preferably 0.6 to 1.7 mol, more preferably 0.7 to 1.5 mol and still more preferably 0.7 to 1.0 mol. The branched compound containing a thiol group (P) and the amine-type curing agent can be appropriately used in combination depending on the intended use. Generally, the usage of the branched compound containing a thiol group (P) can be decreased inversely with that of the amine-type curing agent used in combination. As the usage of the amine-type curing agent, the total of the mercapto group amount and the active hydrogen in the amine-type curing agent is preferably 0.6 to 1.7 mol based on 1 mol of the epoxy group in epoxy resin, more preferably 0.7 to 1.5 mol and still more preferably 0.7 to 1.0 mol. The ratio of the mercapto group amount to the active hydrogen amount in the amine-type curing agent can be within the range of 1:99 to 99:1. With a higher mercapto group content, curability at low temperatures is improved while the pot life is shortened. With a higher content of active hydrogen in the amine-type curing agent, the pot life is increased while curability at low temperatures is decreased.

Although there are no particular limitations on the usage of the curing assistant, it is preferably 0.1 to 20 parts by mass, more preferably 0.1 to 10 parts by mass, still more preferably 0.1 to 5 parts by mass and further preferably 1 to 5 parts by mass based on 100 parts by mass of the epoxy resin coating composition. When a basic compound is used as a curing assistant and the usage of the basic compound exceeds 20 parts by mass, it causes a strong irritating odor and may decrease the workability. The usage of the curing assistant may be appropriately changed depending on the curing temperature. The curing assistant content is to be increased to cure the composition at low temperatures and the curing assistant content is to be decreased to cure the composition at high temperature.

[V] Solvent

In the epoxy resin coating composition of the present invention, a solvent can be used as needed in an effort to facilitate mixing of liquid (A) and liquid (B) and to improve coating properties at the time of coating. As a solvent, it is preferable to use a volatile solvent so that the solvent will not remain in the coating film to improve mechanical strength of the coating film after being coated.

As a solvent for liquid (A) containing epoxy resin and a branched compound containing a thiol group (P), it is desirable to use an aprotic volatile solvent containing a nonpolar volatile solvent.

As a nonpolar volatile solvent, for example, aliphatic hydrocarbon, aromatic hydrocarbon, ether, ester other than the thiol-type curing agent and the curing assistant, ketone and N,N-dialkylamide can be used. As the ester other than the thiol-type curing agent and the curing assistant, preferred is ester, which does not contain any of sulfur (S), nitrogen (N) and phosphorous (P) as an element.

As specific examples of the aprotic volatile solvent, petroleum benzene, mineral spirit, solvent naphtha, toluene, xylene, ethylene glycol dimethyl ether, diethylene glycol dimethyl ether, dibutyl ether, ethyl acetate, butyl acetate, 2-n-butoxyethyl acetate, 2-ethoxyethyl acetate, acetone, methyl ethyl ketone, methyl isobutyl ketone, cyclohexanone, N,N-dimethylformamide, N,N-dimethylacetamide, propylene glycol monomethyl ether acetate (PGMEA) and the like can be used, but the aprotic volatile solvent is not limited thereto.

If a protic solvent is used as a solvent for liquid (A), it decreases the storage stability of liquid (A) and causes gelation during storage, which is not desirable. Examples of an undesirable protic solvent include alcohol containing a functional group such as alcoholic hydroxyl group, phenolic hydroxyl group, carboxylic group and amino group; phenol; carboxylic acid; and amine. Specific examples of these protic solvents include n-butanol, i-butanol, 2-butanol, 2-n-butoxy-ethanol, i-propanol, ethanol, cresol, acetic acid and xylenediamine.

Meanwhile, as a solvent for liquid (B) containing a curing assistant, generally-used coating solvents can be used with no limitation. Also, as a diluent at the time of coating, generally-marketed coating solvents can be used with no limitation.

[VI] Additives

Into the epoxy resin composition of the present invention, conventionally known coating additives may be blended as needed within a scope which does not affect the objective of the present invention.

As a coating additive, (a) thermoplastic resin such as polyethylene, polypropylene, polystyrene, (b) deodorizers, (c) adhesion improvers such as silane coupling agent and titanium coupling agent, (d) antioxidants such as hydroquinones and hinderd phenols, (e) ultraviolet light absorbers such as benzophenones, benzotriazols, salicylic acid esters and metal complex salts, (f) surfactants such as stearic acid, zinc stearate, oleic acid, linolic acid, decane sulfonic acid, dodecane sulfonic acid, sodium decane sulfonate and sodium dodecane sulfonate, (g) plasticizers such as phthalic acid ester, phosphoric ester other than the curing assistant, aliphatic acid ester having a high boiling point, epoxidized soybean oil, castor oil, liquid paraffin and alkyl polycyclic aromatic hydrocarbon, (h) waxes such as paraffin wax, microcrystalline wax, polymerized wax, bees wax, spermaceti wax and low molecular weight polyolefin, (i) non-reactive diluents such as tar and bitumen, (j) fillers, pigments or dyes such as calcium carbonate, barium sulfate, kaolin, talc, mica, bentonite, clay, cericite, glass fiber, carbon fiber, aramid fiber, nylon fiber, acrylic fiber, glass powder, glass balloon, Shrasu balloon, coal powder, acrylic resin powder, phenolic resin powder, metallic powder, ceramic powder, zeolite, slate powder, carbon black, alumina, titanium oxide, red iron oxide, para red and Prussian blue, (k) defoaming agents such as silicone oil and polyethylene glycol, (l) dehydrating agents such as a monoisocyanate compound and a carbodiimide compound, (m) antistatic agents, (n) antibacterial agents, (o) mildew-proofing agents, (p) viscosity modifiers, (q) perfumes, (r) flame retardants other than a curing assistant, (s) leveling agents, (t) dispersing agents, (u) radical polymerization initiators and the like may be added. These may be used singly or in combination of two or more thereof at any ratio.

[VII] Preparation Method

In the present invention, the method for preparing liquids (A) and (B) and the method for preparing an epoxy resin coating composition by mixing liquid (A) and liquid (B) just before using are not particularly limited as long as the method is capable of mixing and dispersing appropriate amounts of the materials of the present invention, and the following methods may be included:

(i) kneading the materials in an appropriate container such as a glass flask, a can, a plastic cup and an aluminum cup with a stirrer, a spatula and the like;
(ii) kneading the materials with a double helical ribbon impeller, a gate impeller or the like;
(iii) kneading the materials with a planetary mixer;
(iv) kneading the materials with a bead mill;
(v) kneading the materials with a three-roll mill;
(vi) kneading the materials with an extruder type kneading extrusion machine.

There are no particular limitations on the way of using the epoxy resin coating composition of the present invention, and the composition can be used under low and high temperature conditions ranging from −20 to 200° C. A higher temperature can shorten the pot life and can increase the curing rate, and therefore a cured product can be obtained in a shorter period of time. However, since there is a fear of odor generation by thermal decomposition and coloring of the cured product, the temperature is in the range of preferably −5 to 120° C., more preferably 5 to 120° C. Particularly, the epoxy resin coating composition of the present invention has highly excellent curability at low and ordinary temperatures.

In order to cure the composition at low temperatures, a strongly basic curing assistant may be employed or an amount of the curing assistant to be used may be increased. In order to cure the composition at high temperatures, a weakly basic curing assistant may be employed or an amount of the curing assistant to be used may be decreased.

[VIII] Usage

The usage of the epoxy resin coating composition of the present invention is not particularly limited, and the composition can be used for various purposes such as a curing agent and a coating material. Particularly, the coating composition of the invention can be suitably used for the coating of an object such as a large-scale architecture and a floor surface, which is difficult to be subjected to curing by heating, and placed in ordinary temperatures or low temperatures during the winter season. Specifically, the composition can be suitably used for coating an object such as ship bottoms and bridges, where the curing by heating is not available, and an object such as roads and floor surfaces, where rapid curing at ordinary temperatures is required.

EXAMPLES

The present invention will be described in further details hereinafter in reference to examples and comparative examples, but should not be construed as being limited thereto. The term "part(s)" in examples means "part(s) by mass".

Epoxy rein, a branched compound having a thiol group (P), primary thiol, a curing assistant (a basic compound), a curing agent (amine-type) used in the examples and comparative examples are as follows:

Epoxy Resin:

(1) bisphenol A-type glycidyl ether (manufactured by Japan Epoxy Resins Co., Ltd.; trade name "jER (registered trademark) 828"; epoxy equivalent: 186 g/eq) (abbreviated as "828")

(2) phenol novolak-type (manufactured by Japan Epoxy Resins Co., Ltd.; trade name "jER (registered trademark) 152"; epoxy equivalent: 178 g/eq) (hereinafter abbreviated as "152")

(3) bisphenol F-type glycidyl ether (manufactured by Japan Epoxy Resins Co., Ltd.; trade name "jER (registered trademark) 807"; epoxy equivalent: 186 g/eq) (abbreviated as "807")

(4) bisphenol A-type glycidyl ether (manufactured by Japan Epoxy Resins Co., Ltd.; trade name "jER (registered trademark) 1001"; epoxy equivalent: 480 g/eq) (abbreviated as "1001")

Branched Compound Containing a Thiol Group (P):

(1) pentaerythritol tetrakis(3-mercaptobutylate) (manufactured by SHOWA DENKO K.K.; trade name "Karenz (registered trademark) PE1"; thiol group equivalent: 139 g/eq) (abbreviated as "PE1")

(2) 1,4-butanediol bis(3-mercaptobutylate) (manufactured by SHOWA DENKO K.K.; trade name "Karenz (registered trademark) BD1"; thiol group equivalent: 190 g/eq) (abbreviated as "BD1")
(3) tris(3-mercaptobutyryloxyethyl)isocyanurate (manufactured by SHOWA DENKO K.K.; trade name "Karenz (registered trademark) NR1"; thiol group equivalent: 147 g/eq) (abbreviated as "NR1")

Primary Thiol:
Quaternary aliphatic polythiol (manufactured by Japan Epoxy Resins Co., Ltd.; trade name "Epicure (registered trademark) QX40"; thiol group equivalent: 127 g/eq) (abbreviated as "QX40")

Curing Assistant (Basic Compound):
2,4,6-tris(dimethylaminomethyl)phenol (reagent manufactured by Tokyo Chemical Industry Co., Ltd.) (abbreviated as "TAP")

Curing Agent:
(1) polyamideamine curing agent (manufactured by Cognis Japan Ltd.; trade name "VERSAMID (registered trademark) 115"; amine value: 238 mgKOH/g) (abbreviated as "V115")
(2) modified aliphatic polyamine curing agent (manufactured by DIC Corporation; trade name "LUCKAMIDE (registered trademark) WN-125"; amine value: 340-380 mgKOH/g) (abbreviated as "WN-125")

Example of Preparation of Liquid (A):
Samples of liquid (A) (A1 to A6 and A61 to A64) containing epoxy resin and a branched compound containing a thiol group (P) were prepared according to the formula shown in Table 1. The number of days until the gelation occurred when these samples of liquid (A) were stored at 60° C. is shown in Table 1.

Samples of liquid A1 to A6 and liquid A61 to A64 were stable for 30 days or more when stored at 60° C.

TABLE 1

|  | Preparation Examples | | | | | |
| --- | --- | --- | --- | --- | --- | --- |
|  | A1 | A2 | A3 | A4 | A5 | A6 |
| 828 (parts by mass) | 100 | 100 | 100 | 100 | 100 | 100 |
| iron oxide (parts by mass) | 50 | 50 | 50 | 50 | 50 | 50 |
| calcium carbonate (parts by mass) | 50 | 50 | 50 | 50 | 50 | 50 |
| Solvent xylene (parts by mass) | 20 | 20 |  |  |  |  |
| butyl acetate (parts by mass) |  |  | 20 |  |  |  |
| PGMEA (parts by mass) |  |  |  | 20 |  |  |
| Methylisobutylketone (parts by mass) |  |  |  |  | 20 |  |
| cyclohexanone (parts by mass) |  |  |  |  |  | 20 |
| PE1 (parts by mass) | 70 | 35 | 70 | 70 | 70 | 70 |
| stearic acid (parts by mass) | 1 | 1 | 1 | 1 | 1 | 1 |
| silicon oil (parts by mass) | 0.003 | 0.003 | 0.003 | 0.003 | 0.003 | 0.003 |
| Number of days until gelation occurred at 60° C. | 30 days or more | 30 days or more | 30 days or more | 30 days or more | 30 days or more | 30 days or more |

|  | Preparation Examples | | | |
| --- | --- | --- | --- | --- |
|  | A61 | A62 | A63 | A64 |
| 828 (parts by mass) | 100 | 100 |  |  |
| 152 (parts by mass) |  |  | 100 |  |
| 807 (parts by mass) |  |  |  | 100 |
| iron oxide (parts by mass) | 50 | 50 | 50 | 50 |
| calcium carbonate (parts by mass) | 50 | 50 | 50 | 50 |
| xylene (parts by mass) | 20 | 20 | 20 | 20 |
| PE1 (parts by mass) |  |  | 79 | 82 |
| BD1 (parts by mass) | 79 |  |  |  |
| NR1 (parts by mass) |  | 102 |  |  |
| stearic acid (parts by mass) | 1 | 1 | 1 | 1 |
| silicon oil (parts by mass) | 0.003 | 0.003 | 0.003 | 0.003 |
| Number of days until gelation occurred at 60° C. | 30 days or more | 30 days or more | 30 days or more | 30 days or more |

Comparative Example of Preparation of Liquid (A):

Samples of liquid (A) (A7 to A12) containing epoxy resin and a thiol-type curing agent were prepared according to the formula shown in Table 2. Gelation was caused in a short time in samples of liquid A7 to A9 because conventional polythiol is used as a thiol-based curing agent. Gelation was caused in samples of liquid A9 to A11 in a shorter time due to the use of a protic solvent compared to the cases where an aprotic solvent is used. This shows that the storage stability is low in the case where a conventional polythiol is used and the case where a protic solvent is used.

TABLE 2

|  | Preparation Examples | | | | | |
| --- | --- | --- | --- | --- | --- | --- |
|  | A7 | A8 | A9 | A10 | A11 | A12 |
| 828 (parts by mass) | 100 | 100 | 100 | 100 | 100 | 100 |
| iron oxide (parts by mass) | 50 | 50 | 50 | 50 | 50 | 50 |
| calcium carbonate (parts by mass) | 50 | 50 | 50 | 50 | 50 | 50 |
| Solvent xylene (parts by mass) | 20 | 20 |  |  |  | 20 |
| n-butanol (parts by mass) |  |  | 20 | 20 |  |  |
| 2-n-butoxyethanol (parts by mass) |  |  |  |  | 20 |  |
| PE1 (parts by mass) |  |  |  | 70 | 70 |  |
| QX40 (parts by mass) | 70 | 35 | 70 |  |  |  |
| stearic acid (parts by mass) | 1 | 1 | 1 | 1 | 1 | 1 |
| silicon oil (parts by mass) | 0.003 | 0.003 | 0.003 | 0.003 | 0.003 | 0.003 |
| Number of days until gelation occurred at 60° C. | 5 days | 5 days | 2 days | 5 days | 10 days | 30 days or more |

Examples and Comparative Examples of Preparation of Liquid (B):

Liquid (B) (Preparation Examples: liquids B1 to B2, Comparative Preparation Examples: liquids B3 to B6) were prepared according to the formula shown in Table 3. Liquids B1 and B2 of Preparation Example and liquid B3 of Comparative Preparation Example were Prepared by Changing the Additive amount of the polyamideamine-type curing agent. When these samples of liquid (B) were stored at 60° C., a skim formation was not observed for 30 days or more.

When the composition liquids B4 to B6 of Comparative Preparation Examples, in which a Thiol-Type Curing Agent is added to liquid (B), were stored at 60° C. in air, a skim formation was observed within 5 to 25 days. This shows that the storage stability of liquid (B) is to be impaired if a thiol-type curing agent is added to liquid (B).

Example 1

30 parts by mass of liquid A containing epoxy resin and a branched compound having a thiol group (P) prepared in Preparation Example A1 and 4 parts by mass of liquid B containing a curing assistant prepared in Preparation Example B1 were mixed to obtain an epoxy resin coating composition. The composition was applied onto a polished steel plate by air sprayer W-101 manufactured by ANEST IWATA Corporation. The air flow rate and valve opening during the coating were adjusted so as to make the film thickness after drying be about 30 microns. When the coating composition was dried and cured at 25° C. after being coated, the time for curing the coating film till the film can be touched with fingers without leaving fingerprints (dry-to-touch time) was one hour and a good coating film was obtained.

Example 2

The coating composition was applied, dried and cured by the same operations as in Example 1 except for using liquid A2 containing a reduced amount of the branched compound having a thiol group (P) in liquid (A) and liquid B2 in which a polyamideamine-type curing agent is added to liquid (B). The dry-to-touch time was four hours and a good coating film was obtained.

TABLE 3

|  | Preparation Examples | | Comparative Preparation Examples | | | |
| --- | --- | --- | --- | --- | --- | --- |
|  | B1 | B2 | B3 | B4 | B5 | B6 |
| TAP (parts by mass) | 10 | 10 | 10 | 10 | 10 | 10 |
| V115 (parts by mass) |  | 50 | 100 | 50 | 50 |  |
| PE1 (parts by mass) |  |  |  | 35 |  | 70 |
| QX40 (parts by mass) |  |  |  |  | 35 |  |
| isobutanol (parts by mass) | 10 | 10 | 10 | 10 | 10 | 10 |
| Methyl ethyl ketone | 15 | 15 | 15 | 15 | 15 | 15 |
| Number of days until a skim was observed at 60° C. | 30 days or more | 30 days or more | 30 days or more | 15 days | 5 days | 25 days |

Examples 3 to 4

The coating composition was applied, dried and cured by the same operations as in Examples 1 and 2 except that curing and drying were carried out at 5° C. The dry-to-touch time was from 5 to 10 hours, which showed that the coating composition can be cured in a short period of time even at a low temperature.

Examples 5 to 6

The coating composition was prepared and applied, dried and cured by the same operations as in Example 1 except for using liquid A62 (in Example 5) or liquid A63 (in Example 6) as liquid (A). The dry-to-touch time was two hours (Example 5) or one hour (Example 6) and a good coating film was obtained.

Comparative Examples 1 to 2

The coating composition was applied, dried and cured at 25° C. (in Comparative Example 1) or 5° C. (in Comparative Example 2) by the same operations as in Example 1 except for using liquid A12 in which a thiol-type curing agent is excluded from liquid (A) and liquid (B) shown in Table 4. The dry-to-touch time was 10 hours (Comparative Example 1) or 32 hours (Comparative Example 2).

TABLE 4

| | | Examples | | | | | | Comparative Examples | |
|---|---|---|---|---|---|---|---|---|---|
| | | 1 | 2 | 3 | 4 | 5 | 6 | 1 | 2 |
| liquid A | Preparation Example A1 (parts by mass) | 30 | | 30 | | | | | |
| | Preparation Example A2 (parts by mass) | | 30 | | 30 | | | | |
| | Preparation Example A62 (parts by mass) | | | | | 30 | | | |
| | Preparation Example A63 (parts by mass) | | | | | | 30 | | |
| | Comparative Preparation Ex. A12 (parts by mass) | | | | | | | 30 | 30 |
| liquid B | Preparation Example B1 (parts by mass) | 4 | | 4 | | 4 | 4 | | |
| | Preparation Example B2 (parts by mass) | | 10 | | 10 | | | | |
| | Comparative Preparation Ex. B3 (parts by mass) | | | | | | | 18 | 18 |
| Curing temperature | | 25° C. | 25° C. | 5° C. | 5° C. | 25° C. | 25° C. | 25° C. | 5° C. |
| Dry-to-touch time (hours) | | 1 | 4 | 5 | 10 | 2 | 1 | 10 | 32 |

Examples 7 to 8

White coatings according to the formula shown in Table 5 were prepared and applied by spray coating so as to have a coating film thickness of 300 μm. The pencil hardness of the coating film after being cured at room temperature for one week is shown in Table 5. The pencil hardness was measured in accordance with JIS K5600-5-4, and the hardness of a pencil which did not scratch the coating film when the test was carried out under a load of 750 g by the hardness meter is shown in the Table. When the salt water resistance test was carried out (being immersed in 3% NaCl aqueous solution at 40° C. for ten days), no cracks, peel-off or swelling was observed in the coating film.

TABLE 5

| | | Examples | |
|---|---|---|---|
| | | 7 | 8 |
| Liquid A | 828 | 100 | 15 |
| | 1001 | 10 | 12 |
| | PE1 | 40 | 3.5 |
| | Phenyl glycidyl ether | 10 | 5.5 |
| | Glycidyloxypropyl-trimethoxysilane | 2 | 0.5 |
| | Xylene | | 7 |
| | 1-methoxy-2-propanol | | 3 |
| | n-butanol | | 1 |
| | Talc | 64 | 20 |
| | Barium sulfide | 20 | 10 |
| | Titanium oxide | 30 | 5 |
| | Alumina | | 20 |
| Liquid B | WN-125 | 20 | 10 |
| | TAP | 2 | 1 |
| | Butyl acetate | 6 | |
| | Xylene | | 4 |
| | n-butanol | 6 | |

TABLE 5-continued

| | | Examples | |
|---|---|---|---|
| | | 7 | 8 |
| Test results | Pencil hardness | H | H |
| | Salt water resistance test | No crack, peel-off or swelling was observed in the coating film | |

INDUSTRIAL APPLICABILITY

The epoxy resin coating composition of the present invention has a suitable pot life and excellent curability particularly at low and ordinary temperature due to the content of a specific branched compound having a thiol group. Also, the composition of the present invention can be prepared by mixing two liquids having excellent storage stability just before using, and has very excellent workability because the two liquids are easy to store.

The invention claimed is:

1. An epoxy resin coating composition which comprises, at least, epoxy resin, a thiol-type curing agent and a curing assistant, being composed of a mixture of two liquids of liquid (A) containing epoxy resin, a thiol-type curing agent and an aprotic volatile solvent and liquid (B) containing a curing assistant, which liquids are mixed just before using, wherein the thiol-type curing agent contains a branched compound containing a thiol group (P), which compound is an ester of polyhydric alcohol with secondary thiol group- or tertiary thiol group-containing carboxylic acid represented by formula (1)

$$HOCO(CH_2)_n CR^1R^2SH \qquad (1)$$

wherein $R^1$ represents a hydrogen atom or a linear or branched alkyl group having 1 to 10 carbon atoms, $R^2$ represents a linear or branched alkyl group having 1 to 10 carbon atoms, and n represents an integer of 1 to 4, wherein the epoxy resin coating composition does not contain a protic solvent, wherein the content of the thiol-type curing agent is 35 to 82 parts by mass based on 100 parts by mass of epoxy resin, and the content of the curing assistant is 0.1 to 20 parts by mass based on 100 parts by mass of the epoxy resin coating composition.

2. The epoxy resin coating composition according to claim 1, wherein the branched compound containing a thiol group (P) is an ester of polyhydric alcohol with secondary thiol group- or tertiary thiol group-containing carboxylic acid represented by formula (2)

$$HOCOCH_2 CR^1R^2SH \qquad (2)$$

wherein $R^1$ and $R^2$ have the same meanings as in claim 1.

3. The epoxy resin coating composition according to claim 2, wherein the branched compound containing a thiol group (P) is an ester of polyhydric alcohol with secondary thiol group- or tertiary thiol group-containing carboxylic acid represented by formula (3)

$$HOCOCH_2 CH(CH_3)SH \qquad (3)$$

4. The epoxy resin coating composition according to claim 1, wherein the polyhydric alcohol is a polyhydric alcohol having 2 to 30 carbon atoms and having a valence of 2 to 6.

5. The epoxy resin coating composition according to claim 4, wherein the polyhydric alcohol is at least one member selected from a group consisting of ethylene glycol, 1,2-propylenediol, 1,3-propanediol, 1,4-butanediol, trimethylolpropane, pentaerythritol, 2,2-bis(2,3-dihydroxypropyloxyphenyl)propane, glycerin, trimethylolethane, tris(2-hydroxyethyl)isocyanurate and dipenthaerythritol.

6. The epoxy resin coating composition according to claim 1, wherein the branched compound containing a thiol group (P) is at least one compound selected from a group consisting of ethylene glycol bis(3-mercaptobutyrate), 1,2-propylene glycol bis(3-mercaptobutylate), 1,3-propylene glycol bis(3-mercaptobutylate), 1,4-butanediol bis(3-mercaptobutylate), 2,2-bis(3-(3-mercaptobutyryloxy)-2-hydroxypropyloxyphenyl)propane, glycerin tris(3-mercaptobutyrate), trimethylolpropane tris(3-mercaptobutyrate), trimethylolpropane bis(3-mercaptobutyrate), trimethylolethane bis(3-mercaptobutyrate), pentaerythritol bis(3-mercaptobutyrate), trimethylolethane tris(3-mercaptobutyrate), pentaerythritol tris(3-mercaptobutyrate), tris(3-mercaptobutyryloxyethyl)isocyanurate, a compound wherein two 3-mercaptobutanoic acid have undergone addition to tris(2-hydroxyethyl)isocyanurate, pentaerythritol tetrakis(3-mercaptobutyrate), dipentaerythritol pentakis(3-mercaptobutyrate), dipentaerythritol hexakis(3-mercaptobutyrate), bisphenol A ethoxylate bis(3-mercaptobutyrate), 4,4'-(9-fluorenylidene)bis(2-phenoxyethanol)bis(3-mercaptobutyrate), pentaerythritol tris(3-mercaptovalerate), ethyleneglycol bis(3-mercaptovalerate), trimethylolpropane tris(3-mercaptovalerate), trimethylolpropane bis(3-mercaptovalerate), pentaerythritol bis(3-mercaptovalerate), pentaerythritol tris(3-mercaptovalerate), pentaerythritol tetrakis(3-mercaptovalerate), ethyleneglycol bis(3-mercaptoisovalerate), pentaerythritol bis(3-mercaptoisovalerate), trimethylpropane tris(3-mercaptoisovalerate), trimethylpropane bis(3-mercaptoisovalerate), pentaerythritol tris(3-mercaptoisovalerate) and pentaerythritol tetrakis(3-mercaptoisovalerate).

7. The epoxy resin coating composition according to claim 1, wherein the solvent of the liquid (A) comprises one or more solvents selected from the group consisting of aliphatic hydrocarbon, aromatic hydrocarbon, ethers, esters other than the said thiol-type curing agent or curing assistant, ketones and N,N-dialkylamides; and the solvent does not contain any functional group of an alcoholic hydroxyl group, a phenolic hydroxyl group, a carboxyl group or an amino group.

8. The epoxy resin coating composition according to claim 1, wherein the liquid (B) contains at least one amine-type curing agent selected from a group consisting of polyamine, modified polyamine and polyamide amine.

9. The epoxy resin coating composition according to claim 1, wherein the epoxy resin is a glycidyl ether compound of polyol.

10. The epoxy resin coating composition according to claim 1, wherein the curing assistant is tertiary amine.

* * * * *